United States Patent Office 3,421,140
Patented Jan. 7, 1969

3,421,140
PROCESSING OF SEISMIC DATA OBTAINED WITH LONG SHOT-DETECTOR DISTANCES
Clyde W. Kerns, Irving, Tex., assignor to Mobil Oil Corporation, a corporation of New York
Filed May 31, 1967, Ser. No. 642,593
U.S. Cl. 340—15.5
Int. Cl. G01v 1/30
6 Claims

ABSTRACT OF THE DISCLOSURE

The specification discloses a process for recovering shallow reflection information from seismograms produced with long shot-detector distances and having no identifiable shallow primary reflections. Synthetic shallow primary events are produced by autocorrelating each seismic trace. Multiple reflections generated by shallow horizons synthesize the primary events. Each autocorrelated trace is then recorded in side-by-side relation to produce a simulated seismogram. Also disclosed is a technique for generating all first order surface multiples by autoconvolving each autocorrelated trace.

BACKGROUND OF THE INVENTION

Field of the invention

This invention relates to reflection seismic exploration and more particularly to a method of processing seismic data signals obtained with long shot-detector distances to recover shallow reflection information.

Description of the prior art

The basic technique of reflection seismic exploration is to initiate a seismic disturbance at a shotpoint along the earth and to detect the resultant waves received at a spread of detecting stations along the earth. A separate signal representative of the waves received is derived from each detector station and all of these signals are formed into a seismogram. The seismogram represents with varying degrees of success the subsurface characteristics of the earth. The raw field seismogram includes not only primary reflections (waves reflected only once by a subsurface horizon before being detected), but also multiple reflections (wave reflected more than once before being detected).

The current trend in the seismic exploration industry is to use longer and longer offset distances between the shotpoint and the detecting spread. Sometimes the offset distances are on the order of one mile in length. These long offset distances provide sufficient residual normal moveout of multiple reflections to permit their suppression upon compositing of the proper seismic signals in accordance with the common depth point technique. In general, the longer the shot-detector offset distance, the more residual normal moveout of multiple reflections there is produced and thus, the greater the suppression of multiple reflections.

One problem with maintaining a relatively long shot-detector offset distance is that very little shallow reflection information is detected and recorded. The primary reflections from the shallow subsurface layers are ordinarily dissipated before they reach the detecting spread. Thus, on the raw field seismogram produced with long shot-detector offsets little shallow reflection information is identifiable.

The lack of shallow reflection information presents two problems. First, the shallow data is needed for making static corrections in the seismic signals to compensate for differences in elevation and other errors known in the art. Second, in the absence of the shallow reflection information it is difficult for a seismologist interpreting a seismogram to discriminate between multiple reflections and primary reflections occurring deep in the seismogram The seismologist needs the shallow primary reflections in order to be able to identify reflecting horizons that could have caused multiple reflections occurring deep on the seismogram.

One way to solve the problem of lack of shallow data is to run a separate survey in the area with a short offset distance between shotpoint and detector. Of course, this is very expensive and duplicates effort. Another way to provide shallow reflection information at the same time as providing necessary residual moveout for multiple reflections with only single survey of the area, is by use of the technique disclosed in U.S. Patent No. 3,352,377 entitled Multiple Coverage Seismic Exploration utilizing two groups of detectors separated by a gap. The technique mentioned in this patent satisfactorily provides the shallow reflection information. However, much data was gathered with long shot-detector distances before the advent of this technique and furthermore many companies and seismic field crews still prefer to use the long shot detector offset distances for various reasons.

SUMMARY OF THE INVENTION

My invention provides shallow reflection information by a processing technique applied to seismograms produced with long shot-detector distances and containing no shallow reflection information. Thus, by use of my invention an exploration area need not be resurveyed with a detector spread close to the shotpoint. I have discovered that the multiple reflections which were long thought to be detrimental to the interpretation of seismograms can be turned to advantage in providing shallow reflection information. The shallow reflection information contained among the multiples may be recovered and made useable by the technique known as autocorrelation or by an analog of autocorrelation.

Therefore, in accordance with my invention, seismic data signals individually representative of horizontally spaced subsurface depth points, but having no identifiable shallow primary reflections, may be processed to produce a simulated seismogram recorded with a short offset between shotpoint and detector spread. More specifically the seismic data signals are individually applied to a device for producing a correlation signal representative of the similarity between the portion of each seismic signal following the direct refraction waves or so-called "first breaks" and a stored replica of this same portion as a function of the relative time shift between them. The the correlation signals are applied to an ordinary seismic graph recorder for visual recording in side-by-side relation. On the resulting record, multiple reflections which were reflected from shallow subsurface horizons will interact with themselves and with primary reflections deep on the record to produce synthetic primary wavelets shallow on the record. All the multiple reflections, except those that go to make up the synthetic primary event, will be suppressed.

In accordance with another feature of my invention there is produced a record containing predominantly first order surface multiples (those three bounce multiple with one bounce from the earth's surface). The correlation signals obtained as described above are applied to device for filtering each correlation signal with itself as known in the art, "autoconvolution." The synthetic primary events on the correlation signal will interact with themselves to produce only and all first order surface multiples. The primary reflections will be suppressed relative to the newly created first order surface multiples Each of the filtered signals is then applied to a visual recorder for recording in side-by-side relation.

DETAILED DESCRIPTION OF THE INVENTION

Figure 1:
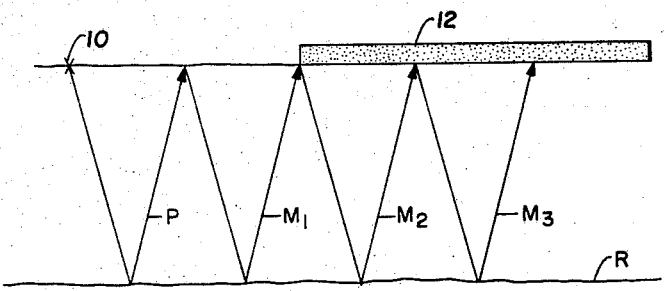
FIGURE 1 is a schematic of the seismic reflections received at a detecting spread located at a long offset distance from a shotpoint.

FIGURE 1 illustrates schematically the problem of loss of shallow reflection information when a shotpoint 10 is located at a long offset distance from a detecting spread 12. Only a single reflecting layer R is illustrated for simplicity. The primary reflection P returns to the earth's surface at a point where there are no detectors to receive it. As a result, the field seismogram 16 illustrated in FIGURE 3 contains no events that would permit mapping of shallow reflector R.

Producing shallow primaries

In accordance with my invention a field seismogram having no identifiable shallow primary reflections may be processed to produce a synthetic record on which synthetic wavelets indicate the travel time of a primary reflection which would have been recorded had there been a detector close to the shotpoint. The principle of my invention can be explained by inspection of the characteristics of multiple reflections. I have observed that every primary reflection from deep subsurface horizons is followed by a multiple reflection from shallow subsurface horizons. The time interval between this primary reflection and this multiple reflection then yields the two-way travel time of seismic energy to the shallow horizon. Furthermore, there are many multiple reflections buried within a field seismogram that contain the same periodicity or recurring time interval for shallow subsurface horizons that are not identifiable by shallow primary reflections. These recurring periodicities are masked within a field seismogram so that they are not apparent to the human eye. However the well-known technique of autocorrelation will seek out these periodicities and produce by the additive interaction of multiple reflections and deep primary reflections, synthetic wavelets at the proper travel time for primary reflections from shallow horizons.

Figure 3:
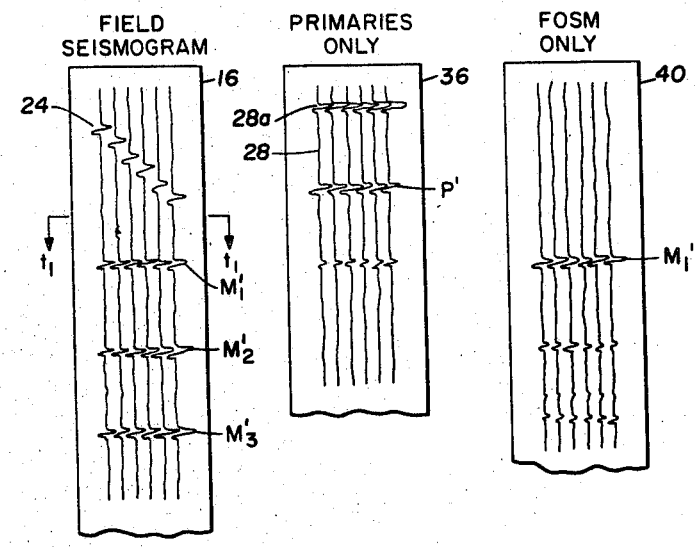
FIGURE 3 is a comparison of schematic seismograms according to conventional practice and according to my invention based upon the seismic reflection situation of FIGURE 1.

FIGURE 3 illustrates a schematic example of the principle just described. Seismogram 16 produced from the seismometer spread 12 in FIGURE 1 has no identifiable primary reflections for reflector R. However, it does contain multiple reflections $M_1'$, $M_2'$, and $M_3'$ which were generated by the primary wave P. The period between multiples $M_1'$ and $M_2'$ and between $M_2'$ and $M_3'$ is the same as the two-way travel time of primary event P. Therefore, the autocorrelation technique may be used for each of the seismic traces on raw field seismogram 16 to generate a synthetic primary wavelet from the interaction of multiples $M_1'$, $M_2'$, and $M_3'$. Each of these autocorrelation functions is written out in side-by-side relation to form a simulated seismogram 36 on which there appears the synthetic primary wavelet P'.

It should be remembered that the above given example is only diagrammatic. On an actual field seismogram there will be millions of very small multiple reflections which bear the proper travel time of shallow primary reflections and through the additive process of autocorrelation produce a comparatively large synthetic primary wavelet at shallow times. The resulting simulated seismogram of autocorrelated traces will then appear to contain only primary reflections.

Figure 2:
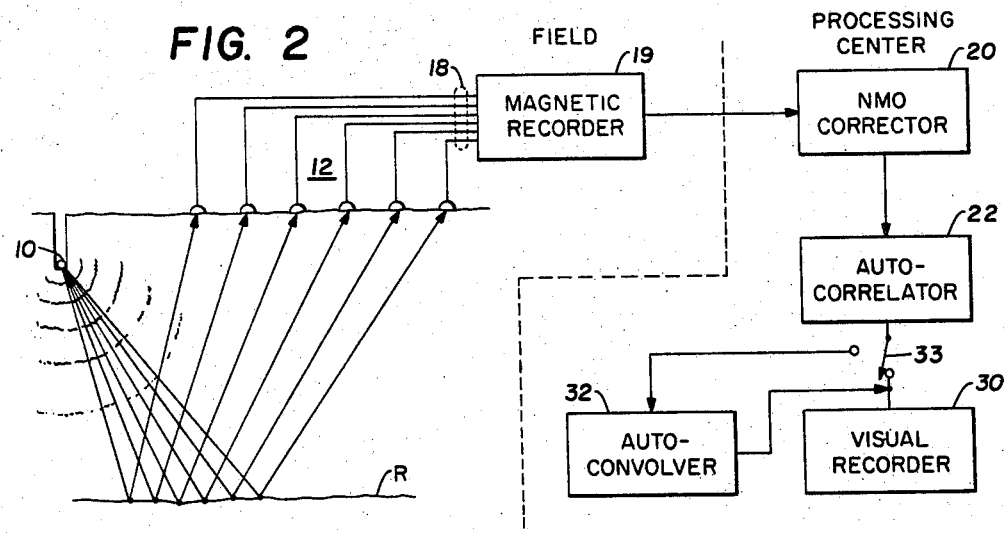
FIGURE 2 is a flow diagram for seismic processing in accordance with my invention.

Referring now to FIGURES 1–3, there will be described further details of my invention. When seismic energy is induced at shotpoint 10 as by the explosion of dynamite, the spread of seismometers 12 receives reflections from subsurface horizons such as the one illustrated at R. The output of each seismometer of spread 12 is connected by way of a separate conductor in cable 18 to the input of a multichannel magnetic tape recorder 19. Each of the signals recorded from the output of seismometers 12 is representative of a horizontally spaced depth point such as on reflector R.

Magnetic tapes bearing the seismic traces may then be transmitted to a processing center for processing in accordance with my invention. They are first corrected for shotpoint and spread geometry in normal moveout corrector 20. They need not be corrected for statics. Then the normal moveout corrected seismic signals are each applied to autocorrelator 22. Only the portion of each seismic trace following the time of arrival of direct refractions or first breaks 24 should be autocorrelated. Otherwise, the noise present in the zone of first breaks 24 might interfere with the autocorrelation process and produce erroneous results. Thus, for example, the remaining portion of each seismic trace after time $t_1$ would be applied to autocorrelator 22. Autocorrelator 22 may be operated to produce only one half of an autocorrelation function at its output. This is because an autocorrelation function is symmetrical about the zero relative shift position.

Each of the one-half autocorrelation functions from the output of autocorrelator 22 is now applied to a visual recorder 30 where each is recorded in side-by-side relation to produce the visual record 36. The zero shift position of each autocorrelation function is recorded at a time corresponding with zero two-way travel time. Thus, on the resulting record 36 the lineup of synthetic primary wavelets P' permits a seismologist to map the shallow reflector R. Furthermore, he may use record 36 in comparison with field seismogram 16 to identify primary reflections on the field seismogram.

Producing first order surface multiples

In accordance with another feature of my invention, the output of the autocorrelator 22 is applied to an autoconvolver 32 as indicated generically by closure of switch 33. The output of autoconvolver 32 then represents predominantly the first order surface multiples. Only the portion of each autocorrelation function following the large pulse 28 at the zero shift position is applied to the autoconvolver 32. Stated differently, the large pulse 28 at the zero shift position is deleted or "trace zeroed" before each trace is autocorrelated. If it were not deleted it might provide false indications of first order surface multiples.

The operation of the autoconvolver 32 is analogous to the operation of time domain filtering. Consider that the impulse response of a time domain filter is adjusted to correspond identically with the waveform of the input. When the input signal is applied to the time domain filter, the output signal will be an autoconvolution of the input signal.

The output of the autoconvolver 32 is also applied to a visual recorder 30 where each of the autoconvolved traces is visually recorded in side-by-side relation to produce record 40. The lineup of first order surface multiple $M_1'$ is apparent. A seismologist now may compare record 40 with the raw field seismogram 24 to identify the first order surface multiples on the raw field seismogram.

Inverse filtering

In a preferred mode of my invention the effect of the shot pulse is removed by inverse filtering techniques before the final records 36 and 40 are produced. Preferably, this is done by inverse filtering as disclosed in my U.S. patent application, Ser. No. 547,344, entitled Stabilizing the Process of Deriving Geophysical Inverse Filters, filed on May 3, 1966. The inverse filtering may be done in either of two ways. First, the inverse filter may be derived and then applied directly to the raw input seismic signal. Alternatively, and preferably, the inverse filter operator may be autocorrelated and then convolved with the autocorrelated seismic signal. The two methods are fully equivalent and the choice between them rests upon economics of computing.

*Frequency domain processing*

It is presently preferred to carry out my invention in the time domain as described above. However, frequency domain processing is fully equivalent and may become preferred at a later time due to the economics of computing. Basically, the frequency domain processing is done with the analog of autocorrelation and autoconvolution. The following is an example of the frequency domain analog for autocorrelation. The basic steps are:

(1) Transform the seismic trace by Fourier transform methods into its real and imaginary components.

(2) Square the real component and the imaginary component and add the squared products together.

(3) Retransform the real and imaginary squared products back into the time domain with inverse transform methods. For the inverse transform the real component is set equal to the sum of the squared components as performed in step 2 and the imaginary component is set equal to zero.

*Digital implementation*

The preferred mode of implementing my invention is with a general purpose digital computer coupled with an automatic oscillographic recorder. The digital computer is programmed to select a portion of each seismic trace of a raw field seismogram recorded upon magnetic tape and autocorrelate this portion in accordance with the procedure described above. The automatic oscillographic recorder may then operate either on-line or off-line with the digital computer. If it operates off-line the autocorrelation functions from the output of the digital computer are recorded on magnetic tape and transferred to the tape transport associated with the automatic oscillographic recorder. The recorder may then record the autocorrelated traces in side-by-side relation in similar manner to the recording of an ordinary seismic record section.

A suitable digital computer for carrying out the process of the autocorrelation or autoconvolution is a Control Data Corporation, Model 6600. A suitable automatic oscillographic recorder is the TIDAR playback system available from Texas Instruments, Inc., Dallas, Tex., coupled with a model MS-601 plotter available from Southwestern Industrial Electronics, Inc., Houston, Tex.

Further description should not be required in this specification to disclose the details of the programming technique for carrying out my invention. It should be apparent to a computer programmer with reasonable knowledge in geophysics how to carry out my invention given in this specification. For background information, on the mathematical processes of autocorrelation and autoconvolution, refer to Chapter 1 of Statistical Theory of Communication, Y. W. Lee, John Wiley & Sons, Inc., 1960.

*Analog implementation*

Figure 4:
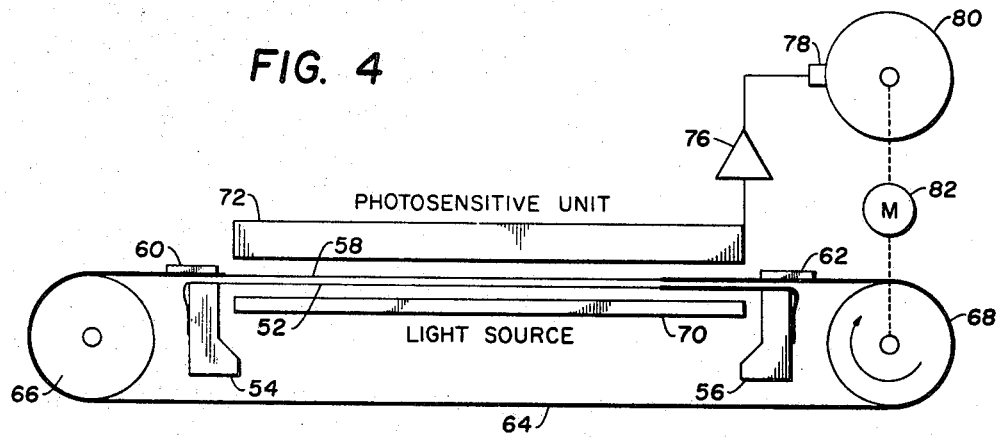
FIGURE 4 is an analog device for implementing my invention.

While the use of a digital computer is the preferred mode for carrying out the processes of autocorrelation and autoconvolution, the device illustrated in FIGURE 4 is one simple analog device which may be used in a location where a digital computer is unavailable. The operation of the device of FIGURE 4 will first be described with reference to the operation of autocorrelation. Then will be described its operation for autoconvolution.

Figure 5:
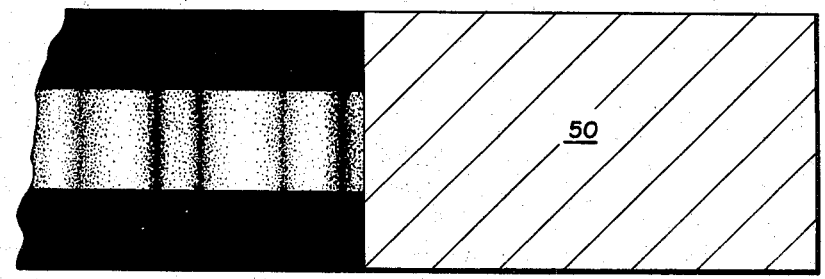
FIGURE 5 is a negative variable density transparency for use in the device of FIGURE 4.

First, a pair of identical negative transparencies are prepared for each seismic trace to be autocorrelated. For example, the negative transparencies may be prepared in the variable denisty form illustrated in FIGURE 5. A mask 50 is placed over the early portion of the seismic trace corresponding with the first breaks. One negative transparency 52 serves as the stored replica for autocorrelation and is stretched across supports 54 and 56. The other transparency 58 is attached by coupling members 60 and 62 to a belt 64 passing over rollers 66 and 68. A light source 70 which may be a fluorescent tube extends along the underneath side of transparency 52 and projects light upward. A photosensitive unit 72 is positioned directly above the light source 70 to sense the light passing through transparencies 52 and 58.

The photosensitive unit 72 may contain a series of selenium cells connected with common circuit outputs to generate voltages in proportion to the light striking unit 72. Alternatively, photosensitive unit 72 may comprise on its underneath side a strip of cadimum sulfide material which varies in resistance in proportion to the amount of light striking it. The cadmium sulfide can be arranged in a voltage circuit so that the variable resistance of the cadmium sulfide generates an alternating electrical signal in proportion to the light passing through transparencies 52 and 58.

The output of signal of photosensitive unit 72 is fed to an amplifier 76, and then the amplified signal is recorded by transducer 78 onto a recording medium located on recording drum 80.

At the beginning of the autocorrelation operation, the two identical transparencies 52 and 58 are fully meshed with one another so that they overlap identically and there is maximum light passing through them. A constant speed motor 82 then rotates roller 68 slowly so that the transparency 58 is slowly shifted past the stationary transparency 52. Motor 82 also rotates the recording drum 80 at the same rate as the rotation of roller 68. As the transparency 58 is slowly shifted past transparency 52, varying amounts of light pass through the two transparencies and strike the photosensitive unit 72. The recorded output of photosensitive unit 72 then corresponds with the autocorrelation function of the seismic signal represented by transparency 52. Motor 50 is allowed to rotate rollers 68 until the transparency 58 shifts completely past the right-hand end of transparency 52 so that no light passes through and the autocorrelation function becomes zero.

The recording medium on recording drum 80 is preferably a magnetic tape which can be later transferred to an automatic oscillographic section writing machine for recording each of the autocorrelation functions in side-by-side relation. Alternatively, the recorder 80 may be a section writer itself and the autocorrelation functions may be recorded directly in seismic section form in sequential manner.

The same device of FIGURE 4 may be used also to perform the process of autoconvolution. Again a pair of negative transparencies are prepared from the autocorrelation functions. The mask 50 (FIGURE 5) is used to cover up the large pulse at the zero shift position of the autocorrelation function. These negative transparencies are used in the same way as described above except that the moving transparency 58 is folded or reversed in sequence with respect to the fixed transparency 52. In other words, the time base of the fixed transparency is folded in an opposite direction with respect to the time base of the moving transparency 58. Before the beginning of the recording process the moving transparency 58 is manually shifted past the light source 70 so that no light passes through to the photosensitive unit 72. Then the motor 82 is started and the moving transparency 58 moves across the fixed transparency so that the moving transparency is effectively filtered by the fixed transparency. The light passing through the unit 72 is sensed and then recorded on recorder 80. It will be recognized that the device of FIGURE 4 operating in this mode acts as a time domain filter to convolve the data on the two transparencies.

Now that several modifications of my invention have been described, those skilled in the art may imagine still other modifications still within the true spirit and scope of my invention. It is intended to cover all such modifications as fall within the scope of the appended claims.

What is claimed is:

1. A method for mapping shallow reflection horizons from seismic signals arising from horizontally spaced subsurface depth points and having no identifiable primary reflections from such shallow reflection horizons but having multiple reflections generated by such horizons, comprising the steps of:
    (a) applying each of said seismic signals to a device for producing one half of a symmetrical autocorrelation function of the portion of each seismic signal following the direct refraction waves; and
    (b) applying each of said one-half autocorrelation functions to a visual recorder for recording in side-by-side relation to produce a record on which multiple reflections on said seismic signals which were generated by shallow subsurface horizons will appear at the proper travel time for primary reflections from the same horizons.

2. The method of claim 1 wherein step (a) is accomplished in the frequency domain by:
    (a) applying said seimic signals to a Fourier analyzing means to produce the frequency domain components of said seismic signals;
    (b) operating on frequency domain components of each seismic signal with a computing means to produce the frequency domain analog of an autocorrelation function; and
    (c) transforming said frequency domain analog back into the time domain with a computing means to generate said one-half autocorrelation functions.

3. In seismic exploration the method comprising the steps of:
    (a) initiating a seismic disturbance at a source location along the earth;
    (b) detecting the resultant waves at a plurality of detecting locations spaced apart along the earth on a line including said source location;
    (c) recording separately the waves detected at each detecting location to produce seismic signals;
    (d) applying said seismic signals to a device for producing one half of a symmetrical autocorrelation function of the portion of each seismic signal following the direct refraction waves; and
    (e) applying said one-half autocorrelation functions to a visual recorder for recording in side-by-side relation to produce a record on which multiple reflections on said seismic signals which were generated by shallow subsurface horizons will appear at the proper travel time for primary reflections from these same horizons.

4. A method for producing a representation of predominantly first order surface multiples from seismic signals representative of horizontally spaced subsurface depth points, comprising the steps of:
    (a) applying each of said seismic signals to a device for producing one half of a symmetrical autocorrelation function of the portion of each seismic signal following the direct refraction waves;
    (b) applying said one-half autocorrelation functions to a means for filtering each correlation signal with itself; and
    (c) applying said filtered one-half autocorrelation functions to a visual recorder for recording in side-by-side relation to produce a record containing predominantly first order surface multiples.

5. The method of claim 4 which is accomplished for each one-half autocorrelation function by:
    (a) adjusting the impulse response of a time domain filter to correspond with the waveform of a one-half autocorrelation function; and
    (b) applying the corresponding one-half autocorrelation function to said time domain filter.

6. In seismic exploration wherein seismic signals separately representative of reflections from horizontally spaced subsurface depth points are recorded in electrically reproducible form, the method comprising the steps of:
    (a) reproducing each of said seismic signals as an electrical signal;
    (b) selecting a portion of each electrical seismic signal following the direct refraction waves;
    (c) applying said selected portion of each seismic signal to a correlating means to produce a one-half autocorrelation function; and
    (d) applying said one-half autocorrelation functions to a visual recorder for recording in side-by-side relation to produce a record containing predominantly shallow primary reflections which were unidentifiable on the originally recorded seismic signals.

References Cited

UNITED STATES PATENTS

| | | | |
|---|---|---|---|
| 3,045,207 | 7/1962 | Peterson | 340—15.5 |
| 3,059,718 | 10/1962 | Clifford et al. | 340—15.5 |
| 3,252,129 | 5/1962 | McCullough et al. | 340—15.5 |
| 3,307,145 | 2/1967 | Dunster et al. | 340—15.5 |
| 3,339,139 | 8/1967 | Lee et al. | 340—15.5 |
| 3,339,176 | 8/1967 | Sparks | 340—15.5 |

RODNEY D. BENNETT, *Primary Examiner.*

D. C. KAUFMAN, *Assistant Examiner.*